US006227626B1

(12) United States Patent
Blattert

(10) Patent No.: US 6,227,626 B1
(45) Date of Patent: *May 8, 2001

(54) METHOD AND DEVICE FOR CONTROLLING A MOTOR VEHICLE DRIVE TRAIN

(75) Inventor: Dieter Blattert, Kirchheim/Neckar (DE)

(73) Assignee: Robert Bosch GmbH (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/068,850
(22) PCT Filed: Sep. 15, 1997
(86) PCT No.: PCT/DE97/02064
  § 371 Date: Jul. 27, 1998
  § 102(e) Date: Jul. 27, 1998
(87) PCT Pub. No.: WO98/12090
  PCT Pub. Date: Mar. 26, 1998

(30) Foreign Application Priority Data

Sep. 19, 1996 (DE) .............................. 196 38 350
Jul. 26, 1997 (DE) .............................. 197 32 229

(51) Int. Cl.$^7$ ...................................... B60T 13/66
(52) U.S. Cl. ...................... 303/20; 303/7; 303/122.08
(58) Field of Search ........................ 303/3, 7, 15, 20, 303/113.1, 113.4, 155, 122.08, 121

(56) References Cited

U.S. PATENT DOCUMENTS

| 2,108,788 | * | 2/1938 | Farmer et al. ................... 303/20 |
| 5,952,799 | * | 9/1999 | Maisch et al. ................... 303/20 |
| 5,957,551 | * | 9/1999 | Maron et al. .................... 303/20 |
| 5,961,190 | * | 10/1999 | Brandmeier et al. ............. 303/20 |

OTHER PUBLICATIONS

"Bosch Automotive Handbook", 3rd Edition, 1993, pp. 594–643.

* cited by examiner

Primary Examiner—Matthew C. Graham
(74) Attorney, Agent, or Firm—Kenyon & Kenyon

(57) ABSTRACT

A device and a method control units arranged in the power train of a motor vehicle. The vehicle has electrically actuated, wheel brakes, preferably designed with one or two motors. A control arrangement is provided that controls the functions of at least one of the units arranged in the power train and/or the function of the wheel brakes in an open or closed loop and which influence the potential of at least one of these units in response to a signal received. At least one electric storage arrangement is effectively connected to the electrically actuated brakes to supply them with power. The device and method utilize a diagnostic arrangement through which the potential of at least one of the energy storage arrangement is detected.

22 Claims, 1 Drawing Sheet

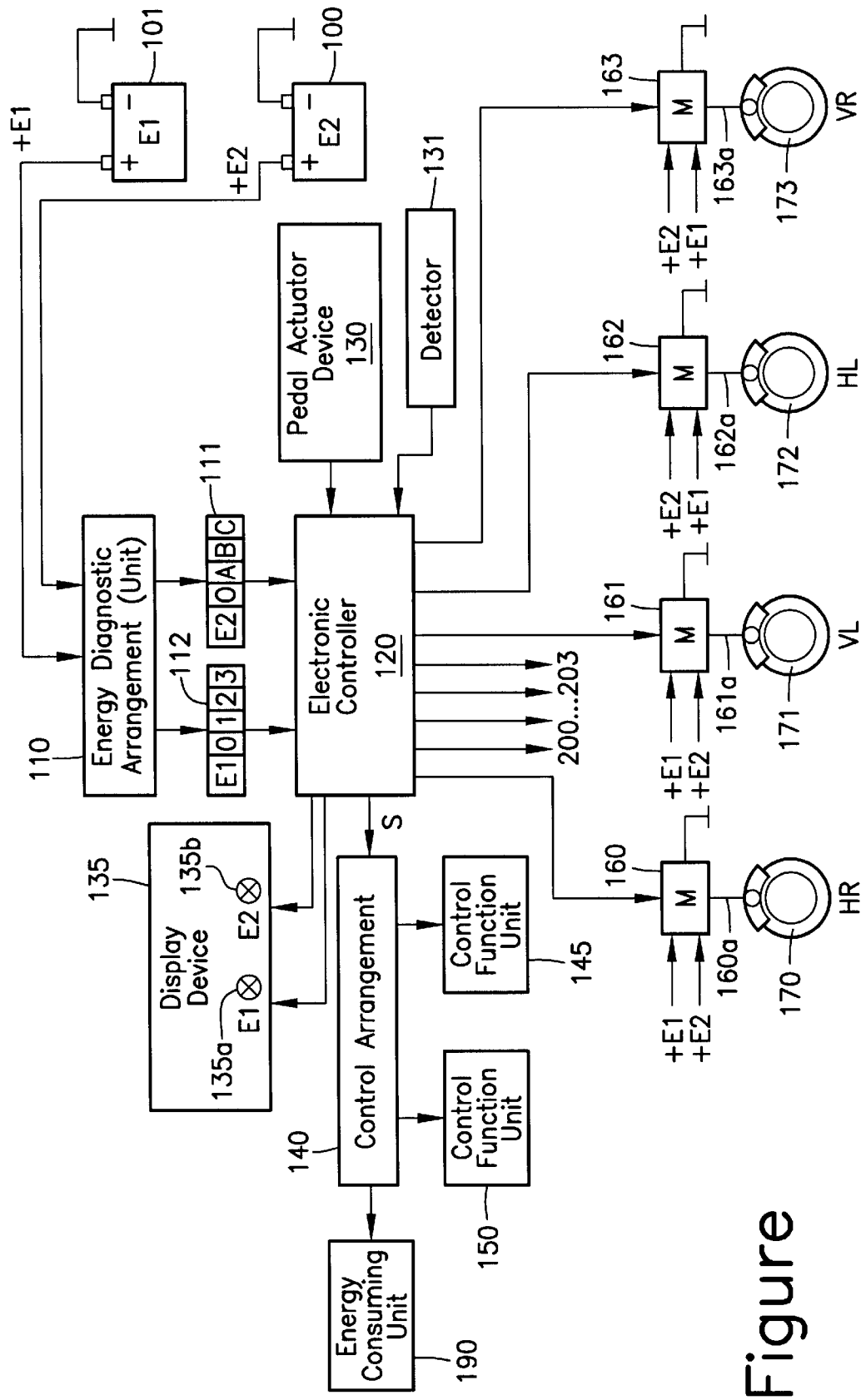

METHOD AND DEVICE FOR CONTROLLING A MOTOR VEHICLE DRIVE TRAIN

FIELD OF THE INVENTION

The present invention relates to a device and a method for controlling the brake system of a motor vehicle.

BACKGROUND INFORMATION

A plurality of different brake system embodiments are known. An overview of brake systems is shown, for example, in Bosch Kraftfahrtechnische Taschenbuch, 21st edition, pp. 594–643 (Bosch Automotive Handbook, $3^{rd}$ edition, pp. 594–643). Such brake systems can be designed as hydraulic, pneumatic, or electromechanical brake systems. Electrical actuation of such brake systems may consist, for example, of actuating the valves affecting the braking pressure in the wheel brakes hydraulically or pneumatically. In the case of an electromechanical brake system, the wheel brakes are actuated electromechanically. For brake systems of motor vehicles of a certain size, the law mandates that, in addition to the service brakes, with which the driver can reduce the vehicle speed during normal operation, an auxiliary brake system and a parking brake system be provided. The auxiliary brake system allows the driver to stepwise reduce the speed or the acceleration of the vehicle or bring the vehicle to a stop in the event of a failure of the service brake system. The parking brake system ensures that the vehicle can be held at a standstill on an inclined roadway by mechanical means, in particular in the absence of the driver.

An electromechanical brake system is described, for example, in International Publication No. WO-A 94/24453, where a wheel brake in which the brake application force is generated by an electric motor. It is particularly important in such electromecanically actuated wheel brakes, as well as generally in the other electrically controlled wheel brakes, to ensure the reliable operation of the brake system, especially reliability of the voltage supply provided by the batteries. In particular, the operating reliability of the brake system must be guaranteed even if sufficient braking action can no longer be applied due to the insufficient amount of electric energy stored.

German Patent Application No. 35 02 100 describes a pneumatic brake system for motor vehicles, where two energy storage devices are provided for supplying power to the brake system; depending on the charge status of one energy storage device, the system allows a switchover to the other storage device. An excessively low charge status can be reported to the driver of the vehicle visually and/or acoustically.

German Patent Application No. 39 36 638 describes an electric supply in a motor vehicle, where, depending on the charge status of the vehicle battery, those loads that are not essential for safe vehicle operation can be shut off.

German Patent Application No. 19548560.2 describes a brake system with electrically actuated wheel brakes, which includes a parking brake that can be actuated by the driver. At vehicle start, a test sequence is initiated to test the functionality of the brake system; during this sequence, at least one wheel brake is supplied with a control signal that corresponds to a predefined minimum braking effect. The parking brake is not released if the predefined minimum braking effect on at least one wheel is not achieved. The charge status of the battery or batteries is not measured.

The object of the present invention is to prevent safety-critical situations in electrically controlled brake systems.

SUMMARY OF THE INVENTION

The present invention relates to the control of units arranged in the power train of a motor vehicle. Furthermore, the vehicle has electrically actuated wheel brakes preferably designed with one or two motors that control the functions of at least one of the units arranged in the power train and/or the function of the wheel brakes and influence the potential of at least one of these units in response to a signal supplied. At least one electric energy storage means arrangement is effectively connected to the electrically actuated wheel brakes to supply them with power. One of the advantages of the present invention consists of the fact that diagnostic means are provided through which the potential of at least one energy storage means is detected. The diagnostic means arrangement generate the signal, as a function of the detected potential of at least one of the units arranged in the power train, so that the potential of at least one of the units arranged in the power train is adjusted to the potential detected with a view to driving safety and/or the function of the wheel brakes is influenced to apply a predefinable braking effect.

The present invention offers the advantage that, in the event that an insufficient amount of power is supplied by the energy storage means, safety-critical situations are avoided through intervention in the power train and/or the wheel brakes.

The potential of the energy storage means can be represented by the energy charge status of the energy storage means. In particular, the diagnostic means detect at least two different energy charge states of the energy storage means and the signal generated represents the different energy charge states. With this embodiment, the measures aiming at driving safety can be easily adjusted to the available energy.

The potential of one of the units arranged in the power train or the potential of the entire power train can be represented by the drive power output and/or the drive torque of the vehicle, in particular by the maximum possible drive power output and/or the maximum possible drive torque. The instantaneous or maximum possible power output or the instantaneous or maximum drive torque of the vehicle is adjusted to the energy available for braking.

At least one vehicle engine, in particular an internal combustion engine, a clutch a transmission, a retarder, and/or an exhaust valve can be provided in the vehicle power train. The drive torque and/or the drive power output can be adjusted to the energy available for braking by suitably controlling these units.

In another embodiment, the potential of at least one unit arranged in the power train is adjusted to the potential of at least one of the energy storage means to affect at least one of the units arranged in the power train to support the vehicle braking effect so that a vehicle braking effect is achieved. In this embodiment, the driver's intention to decelerate can be supported by using the signal according to the present invention in that the drive torque and/or the drive power output is reduced even to negative values, according to the potential of the energy storage means. Such negative drive values act as a drag torque on the driven vehicle wheels. If there is just a little energy available for braking, a wheel drag torque is achieved in this manner, which supports the service brake functions (auxiliary and parking brake effects) and thus increases driving safety. In particular, control of the vehicle engine is provided in order to induce a motor drag torque.

In particular, it may be provided that, in response to the signal, i.e., in the event of insufficient power available, the function of at least one of the units arranged in the power train, in particular, of the vehicle engine, is affected so that vehicle start, in particular, engine start, is disabled. It is advantageous that the vehicle engine start is disabled by locking a switch in the appropriate position.

In another embodiment, when the signal represents a potential of at least one of the energy storage devices that is insufficient to start the vehicle engine arranged in the power train, the vehicle motor start is disabled. Also in this case, the start of the vehicle engine can be disabled by locking a switch in the appropriate position. The background of this embodiment is that the energy storage devices are normally used both for supplying power to the brakes and for starting the vehicle engine. High-current capability, i.e., the ability of the energy storage device to supply a high current for starting the vehicle engine, normally decreases with the potential, i.e., the charge status. If the potential of the energy storage device is too low for starting the vehicle engine, a start attempt of the vehicle engine is disabled according to this invention, thus preventing unnecessary energy consumption. In this event (low charge status), the energy still available can be used for maintaining other important functions.

According to the present invention, the electrically actuated wheel brakes may have different operating functions, such as service brake function, auxiliary brake function, or parking brake function, for example. Depending on the amount of energy available, i.e., on the signal obtained, these operating functions are enabled. In this embodiment, only those brake functions that can operate with the available energy are enabled, thus guaranteeing sufficient availability of the braking functions.

It is advantageous if the aforementioned control means is designed so that, in response to the signal, the power train is affected so that the vehicle speed is adjusted in a predefined manner. This means that, while traveling with an insufficient availability of the braking system due to insufficient power supply, safety is guaranteed through a safety-oriented adjustment of the vehicle speed. In this embodiment the vehicle speed can also be limited so as not to exceed a certain higher speed. Furthermore, the vehicle speed can be adjusted by stepwise reducing the maximum vehicle speed. Adjustment can be performed as a function of the potential of the energy storage means represented by the signal. The limitation and/or reduction can be selected as a function of the potential represented by the signal.

For an electromechanically actuated brake, the vehicle decelerations that can be predefined as braking functions (for example, 5.8 m/s$^2$, 2.9 m/s$^2$, 1.5 m/s$^2$) can be assumed automatically according to the contents of the energy storage device. Furthermore, the driver of the vehicle is informed, via a suitable display device, whether such a braking function is effective at the moment. In particular, a gradual speed reduction strategy is provided in the event of a brake failure. An "ultimate" measure within such a speed reduction strategy would be the automatic locking of the parking brake function if the vehicle speed is basically equal to zero. Thus the possible vehicle decelerations are actively assigned to the contents of the energy storage device.

As mentioned previously, the electrically actuated wheel brakes can be designed as electromechanical, hydraulic, or pneumatic brakes.

The present invention also relates to a method of controlling units arranged in the power train of a motor vehicle, with electrically actuated wheel brakes and at least one energy storage means effectively connected to the electrically actuated, preferably one- or two-motor wheel brakes (160–163, 170–173), to supply them with power. The potential of at least one unit arranged in the power train is influenced in response to a signal supplied. Furthermore, the potential of at least one of the energy storage means is determined. Depending on the potential determined of at least one of the energy storage means, the signal is generated so that the potential of at least one of the units arranged in the power train is adjusted to the potential determined of at least one of the energy storage means for driving safety.

BRIEF DESCRIPTION OF THE DRAWINGS

The FIGURE shows a schematic block diagram of an embodiment of a brake system according to the present invention with an electromechanical application of wheel brakes.

DETAILED DESCRIPTION OF THE DRAWINGS

The FIGURE shows an embodiment of an electromechanically driven brake system for motor vehicles, which includes a twin-circuit on-board electrical system. FIG. 1 shows four brakes associated with four wheels of the vehicle. Wheel brake 170 is associated with the right rear wheel, wheel brake 171 with the left front wheel, wheel brake 172 with the left rear wheel, and wheel brake 173 with the right front wheel, for example. The wheel brakes are connected to electromechanical actuators 160, 161, 162, 163 via mechanical linkages 160a, 161a, 162a, and 163a. The electromechanical actuators are controlled by an electronic controller 120 via the corresponding output lines. For reasons of safety and reliability, the on-board electrical system supplying voltage to the actuators is designed with redundancy, so that the actuators associated with the wheel brakes can be supplied by either of two batteries (power supply means). Thus, actuators 160, 161, 162, 163 are connected to the positive terminal of a first battery 101 via supply lines +E1. The actuators are connected to the positive terminal of a second battery 100 via supply lines +E2. Electronic controller 120, which has at least one microprocessor, receives, from a pedal valuator device 130 via an input line, at least one parameter for the degree of actuation of the brake pedal as a measure of the driver's braking intention. Furthermore, electronic controller 120 receives signals from block 131, which detects the operating parameters of the brake system and/or the vehicle. Such operating parameters may include, for example, wheel loads, parameters for the set actual values of the braking effect on each wheel brake (e.g., current, braking torque, temperature, braking force, skidding, etc.), wheel rotation speeds, vehicle speed, brake lining wear, etc. Furthermore, electronic controller 120 is supplied with current from at least one of batteries 101 and 100. The corresponding conductor is not shown in FIG. 1 for the sake of clarity.

Batteries 100 and 101 are connected to energy diagnostic arrangement 110, which supply status signals 112 and 111 to controller 120.

The different functions of the vehicle power train (not illustrated) can be influenced with control arrangement 140, which can be a controller for open- or closed-loop control of the functions of the vehicle engine and/or a clutch, a transmission, a retarder, and/or an exhaust valve. This control means can, however, also be an interface to units 145 and 150, which control those functions. Furthermore, control means 140 can switch energy-consuming units 190 of the vehicle on and off.

Display devices 135 with the two warning lights 135a, 135b can also be controlled by brake controller 120.

The brake system illustrated in the FIGURE has a parking brake (not illustrated) that may be mechanically or electrically operated. To control the parking brakes, controller 120 is provided with terminals, connected to actuators 160, 161, 162, and 163 by conductors 200–203. The parking brakes can be actuated via these conductors 200–203.

The control of such a brake system basically operates as follows: Electronic controller 120 forms a setpoint value for each wheel brake from the degree of brake pedal actuation signal received (block 130), also using additional operating parameters such as wheel loads, brake lining wear, tire size, battery voltage, etc. (block 131); said setpoint represents a measure of the braking effect to be set on the wheel brake (e.g., braking torque, braking force, current through the electric motor, angle of rotation of the electric motor, wheel skid, wheel rotation speed, etc.). Control units, which generate an output signal to approximate the actual values to the setpoint values, according to a predefined control strategy (e.g., PID), regulate the braking effect to the predefined setpoint. The actual values can be either measured on the wheel brakes or computed from the parameters measured there. For example, the pressing force of the brake lining or the drive torque of the motor, which is a direct measure of the braking effect on the respective wheel brake, can be derived from the current flowing through the electric motor. Furthermore, the braking force or braking torque applied can be measured using expansion measuring strips or other appropriate sensors, and the braking moment can be calculated using the brake geometry. The angle of rotation can be determined by means of appropriate angle sensors on the wheel brakes.

The controller output signals for each wheel brake are converted into control signals for the corresponding actuators. Depending on the design of the motor containing the electric actuator, whether it is a stepping motor, commutator motor, or an electronically commutated motor, the control signal represents a number of steps, a pulse duty factor, a voltage, a current, etc. to be output. In the embodiment according to the present invention, commutator motors supplied with current in both directions via a full-bridge output stage by means of a pulse-type control signal with a variable pulse duty factor are used in the actuators. The pulse duty factor is formed according to the control output signals and sets the motor into a predefined position against resetting forces.

The charge status of the two energy storage devices E1 101 and E2 100 is detected and monitored by energy diagnostic unit 110 in a known manner using a combination of voltage monitoring with superimposed current load method. Energy diagnostic unit 110 transmits status signals 111 and 112 to electronic controller 120 of the brake; the status signals represent the instantaneous charge status of energy storage devices 100 and 101. Status signals 111 and 112 may assume four states (0, 1, 2, 3 for E1 and 0, A, B, C for E2) for each charge status of the energy storage device in the range of 0–100% of the maximum charge capacity of the energy storage device, (e.g., 0–10%, 10–40%, 40–60%, 60–100%). Brake controller 120 processes and links these status reports 111 and 112 for an energy balance and enables the possible braking function for the vehicle on the basis of the available energy determined (e.g., service brake, auxiliary brake, or parking brake).

Controller 120 initiates visual and/or acoustic information for the driver about the availability of the braking functions and/or the charge status of the batteries.

If the controller determines, by analyzing status signals 111 and 112 that the energy supply is insufficient for ensuring braking functions, a signal S is sent to the control means or interface 140. The vehicle functions, in particular the power train functions, can be influenced via signal S.

If travel is initiated with insufficient energy available for ensuring braking functions, the start of the vehicle engine may be disabled, for example. This may be accomplished by locking switch 145 in a certain position. For example, the "start engine" point of the ignition switch to be actuated by the driver can be disabled. This will prevent safety-critical situations that might arise if the vehicle were started by the driver despite insufficient braking action.

The energy storage means are normally used both for supplying electric brakes with power and for starting the vehicle engine. As mentioned previously, the high-current capability of the energy storage device, i.e., its ability to provide a high current for starting the vehicle engine, decreases with the charge status of the battery. If the charge status is insufficient for starting the engine, a start attempt of the engine can be disabled and thus unnecessary energy consumption can be avoided. In this case (low charge status) the energy still available can be used for maintaining other important functions.

In addition or as an alternative, if traveling with a limited braking function due to insufficient power supply, the instantaneous and/or maximum drive torque of the vehicle or the instantaneous and/or maximum power output of the vehicle can be limited using means 140 through block 150. This can be accomplished directly by a suitable intervention in the engine control. In addition or as an alternative, the clutch control and/or the transmission control of the vehicle can also be modified in the sense of such a limitation.

The functions of the power train can also be influenced by stepwise enabling the drive torque or drive power output of the vehicle engine according to the energy content of the batteries.

Similarly, an intention to decelerate (brake actuation) of the driver can be supported via signal S by having the power train generate a negative or reduced drive torque. Thus a drag or braking torque is induced on the driven vehicle wheels. This can be accomplished in a known manner through the vehicle engine and/or the transmission (lower gear) and/or by activating a retarder and/or actuating a valve in the exhaust system of the vehicle (exhaust valve).

Furthermore, the maximum vehicle speed can be limited during travel, in the event of limited braking function due to insufficient power supply, by means 140 through block 150. For this purpose, the open- or closed-loop control of the engine can be modified or influenced in an appropriate manner. The maximum speed of the vehicle can be reduced stepwise when signal S is present. Furthermore, signal S may contain quantitative information about the energy balance of the two energy storage devices 100 and 101, determined by controller 120. Thus, for a lower amount of energy available, the maximum allowable vehicle speed can be set lower than for a higher amount of energy available.

Furthermore, in the event of an insufficient amount of energy, due, for example, to a failure of the current generator function, power consumers 190, the function of which contributes to safety less than that of the brake, can be turned off or operated to a limited degree by control means or interface 140. Thus at least most of the brake function can be maintained during travel in the event of insufficient energy balance.

As mentioned previously, predefinable vehicle deceleration values (e.g., 5.8 m/s$^2$, 2.9 m/s$^2$, 1.5 m/s$^2$) can be automatically selected in controller 120 as braking functions depending on the energy storage device content. In the embodiment as shown in the Figure, this brake function is activated within the controller through signal S. Also in this case, the driver of the vehicle can be informed by display device 135 whether such a brake function is effective at a given time. In particular, a stepwise reduction strategy is provided in the event of brake failure. An "ultimate" measure within such a reduction strategy would be the automatic locking of the parking brake function if the vehicle speed is virtually equal to zero. Thus the possible vehicle decelerations are actively associated with the energy storage device contents.

In summary, it is to be noted that, according to the present invention, the availability of the braking functions for the vehicle is recognized by controller 120. The controller only enables the braking functions when sufficient power supply is available, and the driver is informed about the availability acoustically and/or visually.

In the event where insufficient energy availability is determined, vehicle functions can be modified and/or locked via signal S or means 140 in order to avoid vehicle operation that represents a hazard for the driver and other traffic.

What is claimed is:

1. A device for controlling units situated in a power train of a vehicle, the vehicle including energy storage arrangements supplying power to electrically actuated wheel brakes, the device comprising:
   a diagnostic arrangement detecting a first potential of at least one of the energy storage arrangements and generating a signal as a function of the detected first potential; and
   a control arrangement performing, in one of an open-loop manner and a closed-loop manner, at least one of:
      in response to the signal, adjusting a second potential of at least one of the units to substantially correspond to the detected first potential for enhancing driving safety conditions, and
      in response to the signal, applying a predetermined braking effect by controlling the electrically actuated wheel brakes.

2. The device according to claim 1, wherein the electrically actuated wheel brakes include one of a single motor and two motors.

3. The device according to claim 1, wherein the diagnostic arrangement generates an energy charge status corresponding to the first potential of the energy storage arrangement.

4. The device according to claim 3, wherein the diagnostic arrangement detects at least two different energy charge states of the energy storage arrangement, and wherein the signal represents the at least two different energy charge states.

5. The device according to claim 1, wherein the second potential of at least one of the units corresponds to at least one of a drive power output and a drive torque of the vehicle.

6. The device according to claim 5, wherein the drive power output is a maximum possible drive power output, and the drive torque is a maximum possible drive torque.

7. The device according to claim 1, wherein the power train includes at least one of a vehicle engine, a clutch, a transmission, a retarder and an exhaust valve.

8. The device according to claim 7, wherein the vehicle engine includes an internal combustion engine.

9. The device according to claim 1, wherein the control arrangement adjusts the second potential to control at least one of the units for generating a braking action of the vehicle.

10. The device according to claim 1, wherein the control arrangement controls at least one of units as a function of the signal to disable a start of an engine of the vehicle.

11. The device according to claim 10, further comprising:
   a switch being locked in a predetermined position by the at least one of the units to disable the engine.

12. The device according to claim 1, wherein the signal is indicative of the first potential, and wherein, when the first potential is insufficient to start an engine of the vehicle, the control arrangement disables the engine from being started.

13. The device according to claim 12, further comprising:
   a switch being locked in a predetermined position by the at least one of the units to disable the engine.

14. The device according to claim 1, wherein the electrically actuated wheel brakes have different operating functions, the different operating functions being enabled as a function of the signal.

15. The device according to claim 14, wherein the different operating functions include one of a service brake function, an auxiliary brake function and parking brake function.

16. The device according to claim 1, wherein the control arrangement, in response to the signal, at least one of:
   controls at least one of the units to adjust a speed of the vehicle in a predefined manner, and
   controls the electrically actuated wheel brakes as a function of the signal to automatically set predetermined decelerations.

17. The device according to claim 16, wherein the at least one of the units is situated in an engine of the vehicle.

18. The device according to claim 16, wherein the speed of the vehicle does not exceed predetermined vehicle speeds.

19. The device according to claim 18, wherein the speed is set as a function of the first potential indicative of the signal.

20. The device according to claim 16, wherein the speed of the vehicle is set to reduce a maximum vehicle speed in a stepwise manner, the speed being at least one of limited and reduced as a function of a further potential indicative of the signal.

21. The device according to claim 1, wherein the electrically actuated wheel brakes include one of electromechanical brakes, hydraulic brakes and pneumatic brakes.

22. A method for controlling units arranged in a power train of a motor vehicle including electrically actuated wheel brakes and at least one energy storage arrangement supplying power to the electrically actuated wheel brakes, the electrically actuated wheel brakes including at least one motor, the method comprising the steps of:
   detecting a first potential of at least one of the at least one energy storage arrangement;
   generating a signal as a function of the detected first potential; and
   in response to the signal, adjusting a second potential of at least one of the units to substantially correspond to the detected first potential for enhancing driving safety conditions.

* * * * *